Figure 5:
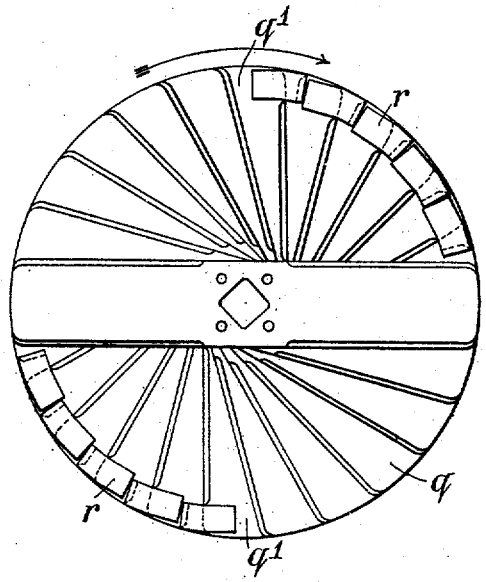

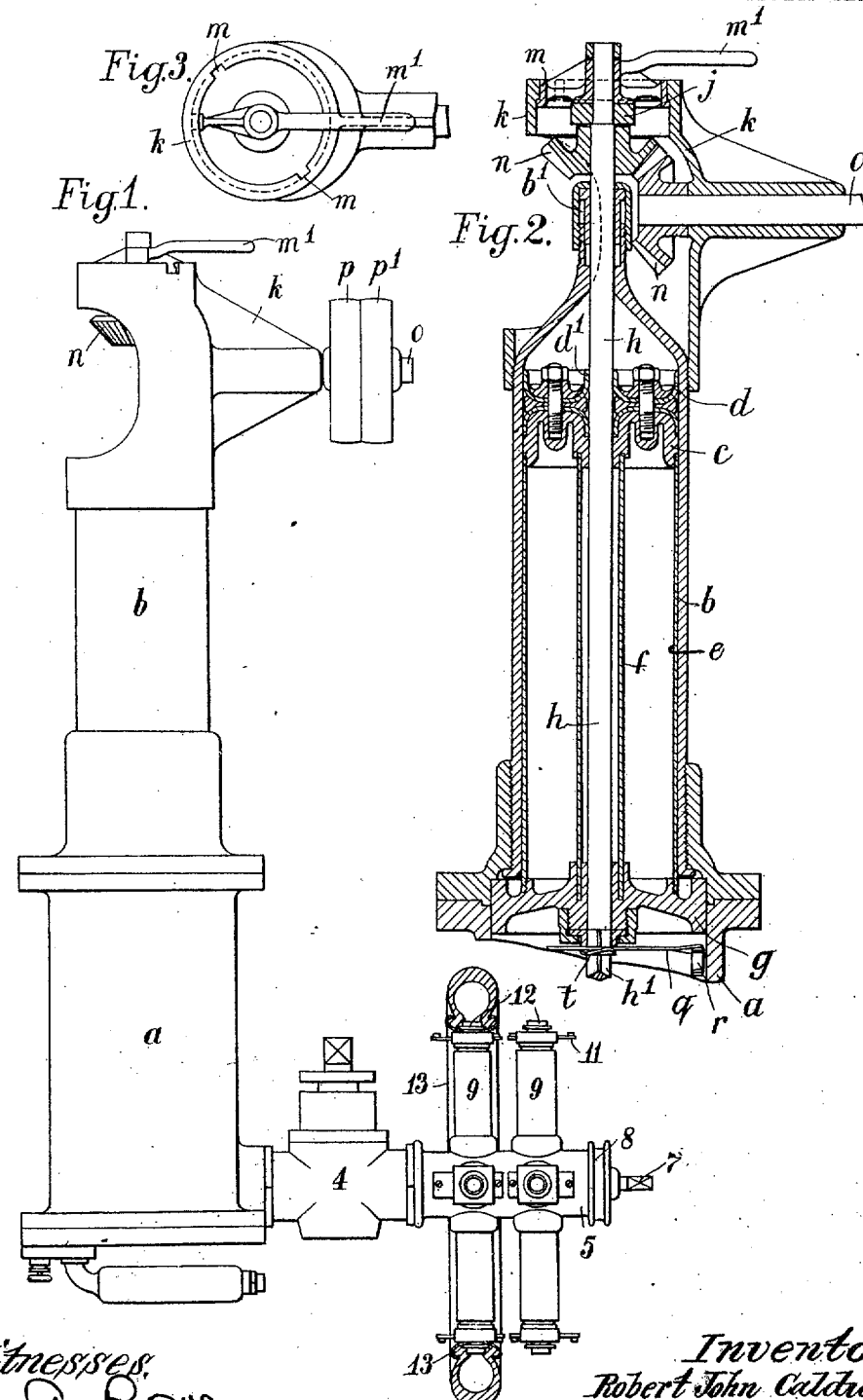

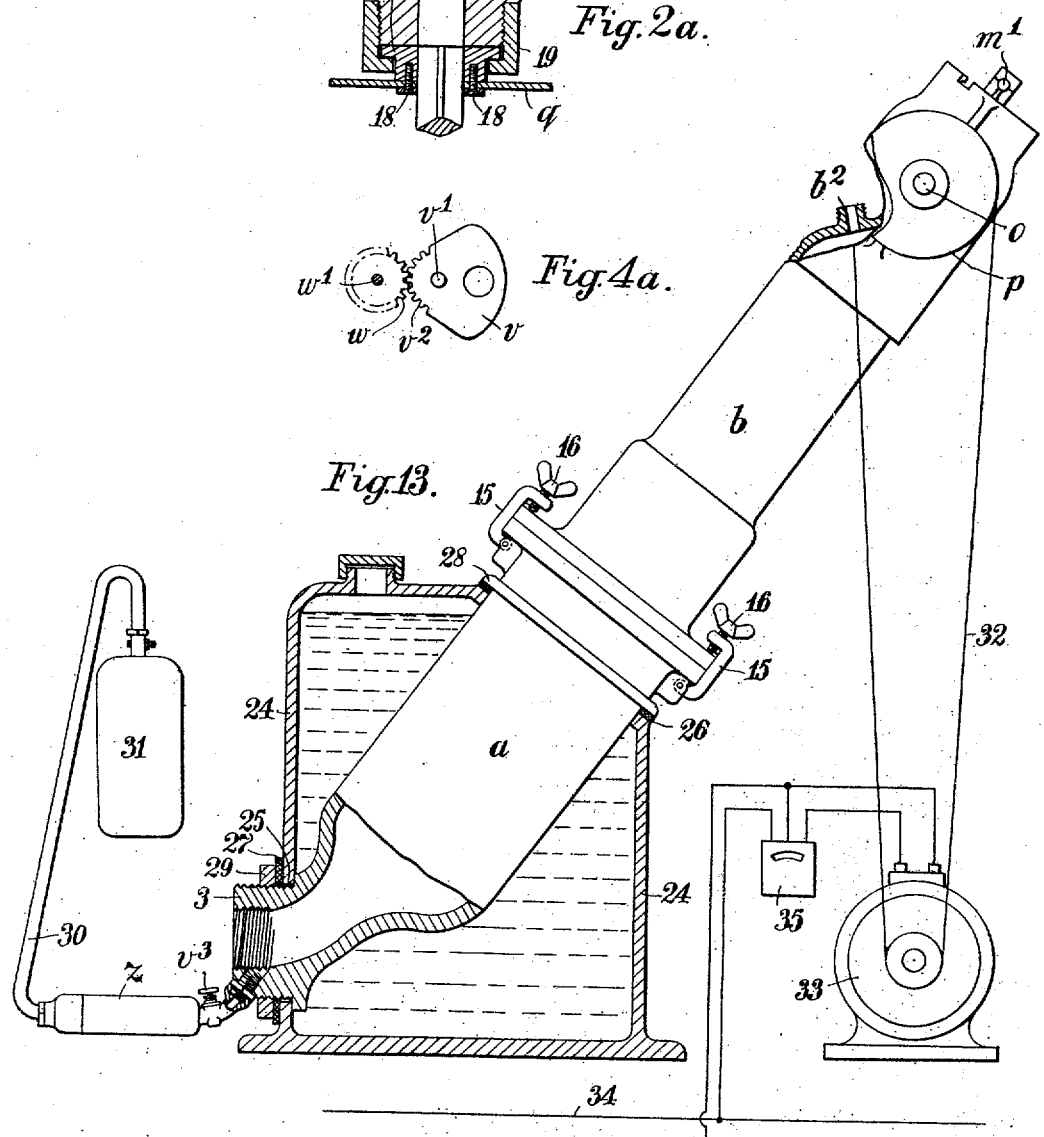

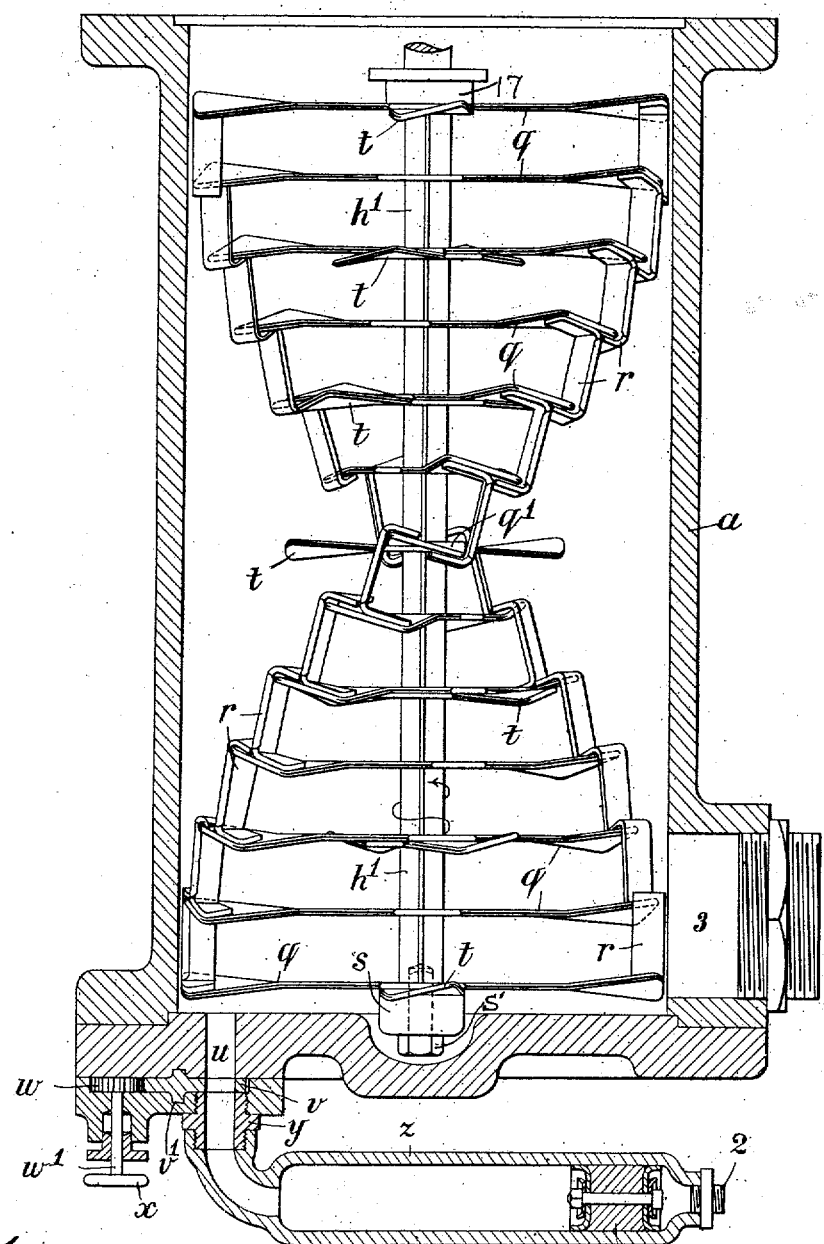

R. J. CALDWELL & F. PFLEUMER.
APPARATUS FOR USE IN THE MANUFACTURE OF ELASTIC CELLULAR FILLING MATERIAL.
APPLICATION FILED JULY 23, 1909.

957,034.

Patented May 3, 1910.

Witnesses.
C. A. Rowe
Robert Everitt

Inventors.
Robert John Caldwell
Fritz Pfleumer
By James L. Norris
Atty.

UNITED STATES PATENT OFFICE.

ROBERT JOHN CALDWELL, OF NEW SOUTHGATE, AND FRITZ PFLEUMER, OF LONDON, ENGLAND.

APPARATUS FOR USE IN THE MANUFACTURE OF ELASTIC CELLULAR FILLING MATERIAL.

957,034.   Specification of Letters Patent.   Patented May 3, 1910.

Application filed July 23, 1909. Serial No. 509,099.

*To all whom it may concern:*

Be it known that we, ROBERT JOHN CALDWELL, a subject of the King of Great Britain, residing at New Southgate, Middlesex, England, and FRITZ PFLEUMER, a subject of the Emperor of Austria-Hungary, residing at London, England, have invented certain new and useful Improvements in Apparatus for Use in the Manufacture of Elastic Cellular Filling Material, of which the following is a specification.

This invention relates to apparatus for use in the manufacture of elastic cellular, foamy or spongy material for filling tires, cushions and the like, for example by the process described in the specification of Letters Patent Nos. 851960, dated April 30, 1907, and 932318, dated August 24, 1909, and in our Letters Patent No. 948845, dated February 8, 1910, said apparatus being of the kind in which there is a closed vessel capable of withstanding high internal pressures and provided with an internal rotary stirrer. According to the present invention, in order to enable the pressure to be conveniently raised in the interior of said closed vessel and therefore also in the tires or other objects to be filled, or to facilitate the expulsion of the contents of said vessel, the closed vessel is provided with a piston or plunger that slides fluid-tight therein and is moved by hydraulic power or other suitable means, for example, by a piston moving in a fluid-pressure cylinder attached to or combined with said closed vessel. The stirrer-spindle preferably extends fluid-tight through said piston or pistons and through the cylinder containing the latter, and in order to permit collapsing of the stirrer during the movement into the closed vessel of the said piston or plunger, the stirrer-blades are mounted on the stirrer-spindle in such a manner that they can move axially along said spindle but are prevented from turning relatively thereto. Suitable means, such as hooks or links, are provided for limiting the separation of said blades during work. Moreover the bearing of the stirrer-shaft is preferably detachably mounted on the exterior of the frame of the machine to permit collapse of the stirrer without or before movement of the said piston or plunger. In order to produce efficient circulation of the material, the stirrer-blades are preferably arranged so as to propel the said material near the axis of said vessel in one direction parallel to said axis and the material near the periphery of said vessel in the opposite direction parallel to said axis. This may be effected either by inclining the parts of the blades near the axis in one direction and parts of said blades remote from the axis in the opposite direction or by providing separate suitably inclined blades for each direction of propulsion. The closed vessel is moreover provided near the bottom with an aperture that may be closed by a rotary or sliding valve which brings the said vessel into and out of communication with a cylinder for receiving the tanning material, *e. g.* a solution of pyrogallol. This cylinder has a suitably packed piston movable freely therein to permit the application of a high-pressure fluid for injecting the tanning material into the closed vessel containing the material to be tanned, *e. g.* a mixture of glycerin and gelatin, without allowing the pressure in said vessel to rise unduly, for example, the said piston abuts against the end of its cylinder and so prevents the pressure of the high-pressure fluid from being communicated to the interior of the vessel containing the material to be tanned. In cases where the apparatus is to be used for filling hollow tires, the outlet orifice of the closed vessel, or each of such orifices, is provided with a fitting consisting of a plurality of telescopic tubular arms radiating from a cylinder or pipe connected to said orifice, the communicating passages between said cylinder or pipe and the interior of said arms being controlled by a valve whereby said passages may be simultaneously opened and closed. The free ends of these telescopic arms are provided with means for coupling them to the inlet apertures of the tire, and preferably also with separate slide or other suitable valves.

In the accompanying drawings, it is shown how the said invention may be conveniently and advantageously carried into practice.

Figure 6:
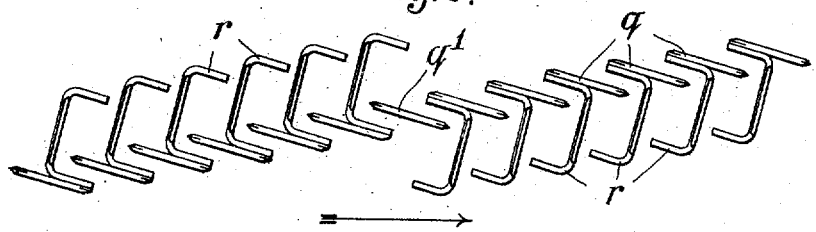
Figure 8:
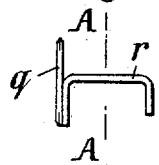
Figure 7:
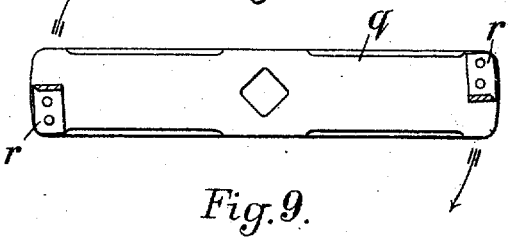
Figure 9:
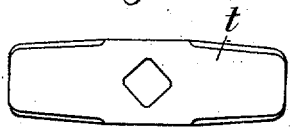
Figure 10:
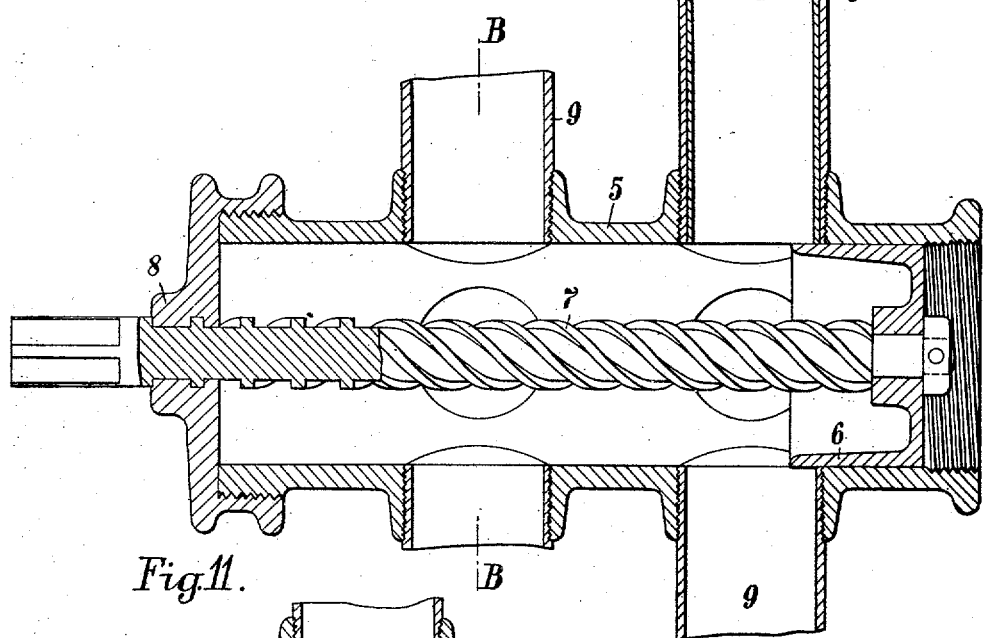
Figure 11:
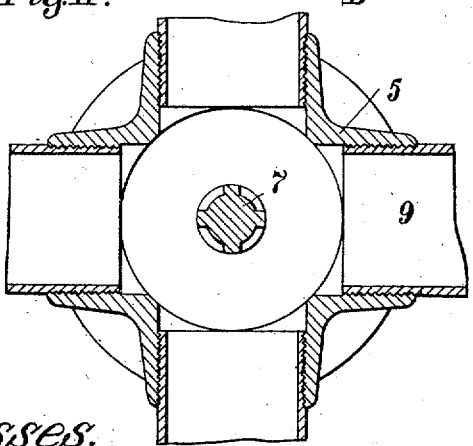
Figure 12:
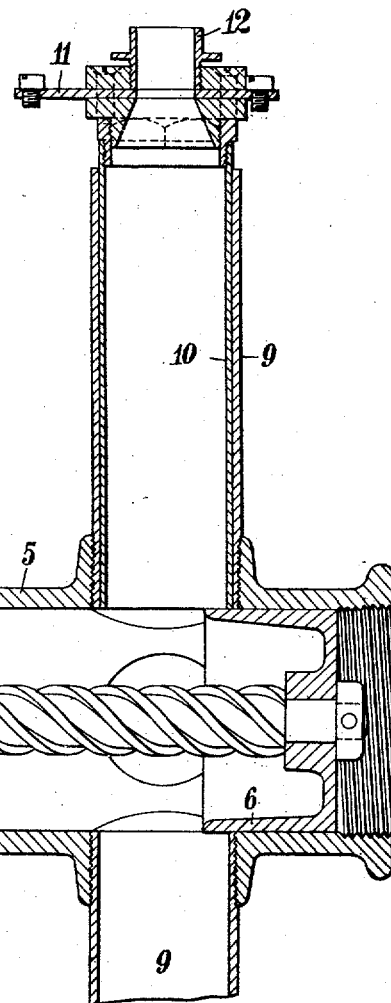

In these drawings, Figure 1 is a side elevation of the whole apparatus. Fig. 2 is a vertical central section drawn to an enlarged scale and showing the upper part of the apparatus including the driving gear for the stirrer and the hydraulic piston or plunger. Fig. 2ª is a view showing part of Fig. 2 drawn to an enlarged scale. Fig. 3 is a plan of the upper part of the apparatus shown in Fig. 2, illustrating a detail of construction. Fig. 4 is a vertical central section drawn to a still further enlarged scale and showing the lower part of the apparatus including the stirrer and the cylinder from which the tanning solution is injected into the material to be stirred. Fig. 4ª is a plan view of a part shown in Fig. 4. Fig. 5 is a plan view of the stirrer. Fig. 6 is a developed side view of one half of the circumference of the stirrer plus the width of one blade, the blades being in their collapsed position. Fig. 7 is a plan of one of the longer stirrer-plates unbent, with the hooks in section on the line A A, Fig. 8, and Fig. 8 is an end elevation of the plate shown in Fig. 7. Fig. 9 is a similar view to Fig. 7, showing one of the shorter stirrer-plates. Fig. 10 is a longitudinal central section of the apparatus for filling the spongy or foamy material into hollow vehicle tires. Fig. 11 is a transverse section on the line B B, Fig. 10, and Fig. 12 is an end view of one of the radial arms of said tire-filling apparatus. Fig. 13 is a side elevation partly in vertical central section, showing a modified form of the improved apparatus. Fig. 14 is a side elevation and Fig. 15 is an end elevation of a modified form of stirrer-plate.

Like characters indicate corresponding parts throughout the drawings.

Referring to these drawings: $a$ is a cylindrical boiler or vessel that is capable of withstanding high pressures and can be maintained at a suitable temperature above that of the atmosphere, for example, by means of a hot water bath or jacket such as that shown in Fig. 13. This boiler is preferably upright, as shown in Fig. 1. $b$ is a cylinder which forms an upward extension of or cover to said boiler and is preferably secured to said boiler by means of flanges engaging with a suitable number of clamps 15, 15, provided with winged screws 16, 16, so as to enable the said extension to be readily removed to permit access being had to the interior of the boiler. In the extension $b$ is fitted a hydraulic piston $c$ provided with suitable packing $d$ and connected by tubes $e, f$ to a piston $g$ which fits the interior of the boiler $a$. By admitting water under pressure into the space above the piston $c$, for example, through an aperture such as that shown at $b^2$, Fig. 13, the piston $g$ can be caused to press on the contents of the boiler in order to expel the same. Through the center of the ram formed by the pistons $c, g$, there extends a spindle $h$ which is packed at $d'$ where it extends through the piston $c$ and at $b'$ by means of a gland and stuffing-box where it passes out of the extension or hydraulic cylinder $b$. The spindle $h$ is rotatably mounted at its upper end in the ball end-thrust bearing $j$ to receive the pressure of the material in the boiler. This bearing $j$ is held in the frame $k$ of the machine by means of a bayonet-joint $m$ controlled by a handle $m'$, so as to enable the bearing $j$ to be released to allow the spindle $h$ to be pushed up out of the boiler by the pressure of the material therein.

The spindle $h$ is adapted to be rotated through miter-gearing $n$, $n$ from a shaft $o$ rotatably mounted in the frame $k$ and driven, e. g. by belt-gearing $p$, $p'$ from an electric motor such as that shown at 33, Fig. 13. That part $h'$ of the spindle $h$, which is in the boiler $a$, is squared and a stirrer, which consists of a series of independent plates $q$, $q$ each having a square hole in the middle and forming a pair of blades, is slid on it. Each plate, except the middle plate $q''$, has a hook $r$ at each end to engage with the preceding plate (reckoning from the ends of the stirrer) which has a slight angular displacement relatively thereto on the spindle. The uppermost plate is rotatably mounted on and at a short distance below the piston $g$, as shown in Figs. 2 and 2ª where the plate $q$ is secured to a flanged collar 17 by means of screws 18, 18. The flanged collar 17 is slidably mounted on the squared portion $h'$ of the spindle $h$ and rotates therewith, and is swiveled to the underside of the piston $g$ by the connection 19. The lowermost plate $q$ is rigidly connected to the lower end of the squared portion $h'$ of the shaft $h$. The connection shown in the drawing consisting of a collar $s$ engaging the underside of said plate and the screw $s'$ extending through said collar into the lower end of the shaft. Each alternate plate $q$ has fixed thereto a shorter plate $t$ also forming a pair of blades which are however bent in the opposite direction to the blades formed by the plates $q$, $q$, so as to move the material in the opposite direction and thus provide a continuous circulation of the material in the boiler $a$, in one direction along the shaft $h$ and in the other direction along the internal periphery of the boiler wall. When the piston $g$ is retracted, and the spindle $h$ is in the operative position, the top and bottom plates $q$, $q$ are drawn apart and the intermediate blades are held at the correct distances apart by the hooks $r$, $r$, as shown in Fig. 4. When the top and bottom plates are pressed together, either by withdrawing the spindle $h$ or by forcing in the piston $g$, the whole stirrer collapses into a small space.

In Figs. 14 and 15 a modified form of stirrer-plate 20 is shown, in which the parts $q'$, $q'$ toward its ends are inclined in one direction and the parts $t'$, $t'$ near the axis are inclined in the opposite direction, the parts $q'$, $q'$ bearing the hooks $r$, $r$. These plates 20 may be used in place of the plates $q$, $t$.

In the lower part of the boiler $a$ is provided an aperture $u$ controlled by a rotary or sliding valve $v$, Figs. 4 and $4^a$ which is pivoted at $v'$ and actuated by means of a segmental gear-wheel $v^2$ formed thereon and engaging with a pinion $w$ having a packed spindle $w'$ provided with an external handle $x$, whereby the valve may be opened and closed. Beyond the valve $v$, the aperture $u$ is connected by a suitable union $y$ to the outlet of a cylinder $z$ which has a piston 1 moving freely but fluid-tight therein (e. g. it may be packed by pump leathers on opposite sides as shown) and has an aperture provided with a union 2 whereby it may be connected to a reservoir 31 of air or other gas at a high pressure, Fig. 13. By removing the cylinder $z$, it may be filled through the outlet aperture with a solution of tanning material which may be injected into the boiler $a$ by admitting high pressure air into the said cylinder at the other side of the piston 1.

Near the bottom of the boiler $a$ are one or more openings 3 provided with suitable cocks 4 for the purpose of withdrawing the finished material. A convenient number of cocks is four set at equal distances around the boiler; one only however is shown in the drawing.

The tire-filling apparatus consists of a cylinder 5 which is connected with the boiler $a$ through the cock 4 and is provided with a piston 6 operated by means of a screw 7 rotatably attached to the piston 6 and a nut 8, by hydraulic power or other suitable means. This apparatus, for tires of the ordinary size used on motor cars, has four radial telescopic tubular arms set at 90° to each other, each consisting of an outer tube 9 and an inner tube 10 and provided with its independent slide-valve 11 which is connected to each of the filling nipples 12, 12 on the tire rim 13. When the piston 6 is withdrawn past the inner ends of the tubes 9, 9, the material is allowed to flow simultaneously into the tire at four points, the streams spreading out in each direction and joining up at four points midway between the points of entry. The air which was previously in the tire escapes through suitable apertures formed in the tire between the inlets for the foamy material, for example, as set forth in the specification of a former application filed on the 6th July 1909, Serial No. 506100.

Although the fitting described above is for filling two tires, it may be made longer to provide for the filling of a number (5 or 6) of tires successively in one operation.

In Fig. 13, a form of apparatus is shown, in which the closed vessel $a$ is arranged at an angle and is heated by means of a water-bath 24, in which it is mounted. In this arrangement, the outlet-nozzle 3 for the cellular material extends through a hole 25 in the wall of the water-bath 24, escape of water at the several joints being prevented by means of leather, india-rubber or like packing-rings 26, 27 which engage with a flange 28 on the vessel $a$ and with a screw-threaded collar or nut 29 on the externally screw-threaded outlet piece 3. The injection-cylinder $z$ is connected to the interior of the vessel $a$ through a cock $v^3$ and through a pipe 30 to a compressed air-cylinder 31. The shaft $o$ is here driven by belting 32 from an electro-motor 33, the current to which may be supplied thereto from electric supply mains 34 through a watt-meter 35 or an ammeter, so as to enable the power taken by the stirrer at any time to be readily measured.

What we claim as new and desire to secure by Letters Patent is:

1. An apparatus for the manufacture of elastic cellular material for filling tires, cushions and other containers of variable capacity, said apparatus comprising a closed vessel capable of withstanding internal pressure, a piston movable in said vessel, and a collapsible stirrer in said vessel.

2. An apparatus for the purposes specified, said apparatus comprising a closed vessel capable of withstanding internal pressure, a piston movable in said vessel, a stirrer-spindle extending through said piston in said closed vessel, stirrer-blades movable axially on but rotatable with said spindle, and means for limiting the separation of said stirrer-blades.

3. An apparatus for the purposes specified, said apparatus comprising a closed vessel capable of withstanding internal pressure, a piston movable in said vessel, a stirrer-spindle extending through said piston in said closed vessel, stirrer-blades movable axially on but rotatable with said spindle, a stirrer-blade rotatably mounted on said piston, a stirrer-blade fixed to the end of said spindle and hooks at the ends of stirrer-blades for engaging adjacent stirrer-blades.

4. An apparatus for the purposes specified, said apparatus comprising a closed vessel capable of withstanding internal pressure, a piston movable in said vessel, a spindle extending through said piston in said closed vessel, a spindle-bearing detachably supported on said closed vessel, stirrer-blades movable axially on but rotatable with said spindle, and means for limiting the separation of said stirrer-blades.

5. An apparatus for the purposes specified, said apparatus comprising a closed vessel capable of withstanding internal pressure, a piston movable in said vessel, a hydraulic cylinder detachably mounted on said closed vessel, a piston movable fluid-tight in said cylinder and connected to the piston in said closed vessel and a collapsible stirrer in said vessel.

6. An apparatus for the purposes specified, said apparatus comprising a closed vessel capable of withstanding internal pressure, a piston movable in said vessel, a stirrer-spindle extending through said piston in said closed vessel, stirrer-blades movable axially on but rotatable with said spindle, said stirrer-blades comprising surfaces arranged near the axis and inclined in one direction and surfaces arranged near the periphery of the closed vessel and inclined in the opposite direction, and means for limiting the separation of said stirrer-blades.

7. An apparatus for the purposes specified, said apparatus comprising a closed vessel capable of withstanding internal pressure, a piston movable in said vessel, a stirrer-spindle extending through said piston in said closed vessel, stirrer-blades movable axially on but rotatable with said spindle, some of said stirrer-blades being short and inclined in one direction and others being long and inclined in the opposite direction, and means for limiting the separation of said stirrer-blades.

8. An apparatus for the purposes specified, said apparatus comprising a closed vessel capable of withstanding internal pressure, a piston movable in said vessel, a collapsible stirrer in said vessel, an injection-cylinder, a piston movable in said injection-cylinder, and a valve controlling the communication between the interior of said injection-cylinder and the interior of said closed vessel.

9. An apparatus for the purposes specified, said apparatus comprising a closed vessel capable of withstanding internal pressure, a piston movable in said vessel, a collapsible stirrer in said vessel, a tire-filling cylinder in communication with the interior of said closed vessel, a plurality of telescopic arms radiating from said cylinder and communicating with the interior thereof, a valve movable fluid-tight in said cylinder and controlling the communication between said cylinder and said arms, and means for moving said valve.

10. An apparatus for the purposes specified, said apparatus comprising a closed vessel capable of withstanding internal pressure, a piston movable in said vessel, a fluid-pressure cylinder detachably mounted on said closed vessel, a piston movable fluid-tight in said cylinder and connected to the piston in said closed vessel, a spindle extending through said pistons into said closed vessel, an end-thrust spindle bearing detachably supported on said vessel, stirrer-blades movable axially on but rotatable with said spindle, and means for limiting the separation of said stirrer-blades.

11. An apparatus for the purposes specified, said apparatus comprising a closed vessel capable of withstanding internal pressure, a piston movable in said vessel, a fluid-pressure cylinder detachably mounted on said closed vessel, a piston movable fluid-tight in said cylinder and connected to the piston in said closed vessel, a spindle extending through said pistons into said closed vessel, a colapsible stirrer mounted on said spindle, means for rotating said spindle, an injection-cylinder, a piston movable in said injection-cylinder, and a valve controlling the communication between the interior of said injection cylinder and the interior of said closed vessel.

12. An apparatus for the purposes specified, said apparatus comprising a closed vessel capable of withstanding internal pressure, a piston movable in said vessel, a fluid-pressure cylinder detachably mounted on said closed vessel, a piston movable fluid-tight in said cylinder and connected to the piston in said closed vessel, a spindle extending through said pistons into said closed vessel, a collapsible stirrer mounted on said spindle, an injection cylinder, a piston movable in said injection-cylinder, a valve controlling the communication between the interior of said injection-cylinder and the interior of said closed vessel, a tire-filling cylinder in communication with the interior of said closed vessel, a plurality of telescopic arms radiating from said tire-filling cylinder and communicating with the interior thereof, a valve movable fluid-tight in said tire-filling cylinder and controlling the communication between said tire-filling cylinder and said arms, and means for moving said valve.

13. An apparatus for the purposes specified, said apparatus comprising a closed vessel capable of withstanding internal pressure, a piston movable in said vessel, a collapsible stirrer in said vessel, an electromotor and power-transmission-gearing between said stirrer and said electromotor.

14. An apparatus for the purposes specified, said apparatus comprising a closed vessel capable of withstanding internal pressure, a piston movable in said vessel, a stirrer-spindle extending through said piston in said closed vessel, stirrer-blades movable axially on but rotatable with said spindle, and means for limiting the separation of said stirrer-blades, an electromotor, a driving shaft to said electromotor, and power-transmission gearing connecting said stirrer-spindle and the driving shaft of said electromotor.

15. An apparatus for the purposes specified, said apparatus comprising a closed vessel capable of withstanding internal pressure, a piston movable in said vessel, a stirrer-spindle extending through said piston into said closed vessel, an end-thrust bearing for said spindle, means for detachably mounting said bearing on said vessel, stirrer-blades movable axially on but rotatable with said spindle and means for limiting the separation of said stirrer-blades.

16. An apparatus for the purposes specified, said apparatus comprising a closed vessel capable of withstanding internal pressure, a piston movable in said vessel, a stirrer-spindle extending through said piston in said closed vessel, stirrer-blades mounted on said spindle with an angular displacement relatively to each other and movable axially on said spindle, and means for limiting the axial separation of said stirrer-blades.

ROBERT JOHN CALDWELL.
FRITZ PFLEUMER.

Witnesses:
GEORGE HARRISON,
LIONEL HOLMES.